Feb. 6, 1940.  G. A. LYON  2,189,743
WHEEL COVER DISK
Filed Aug. 2, 1937
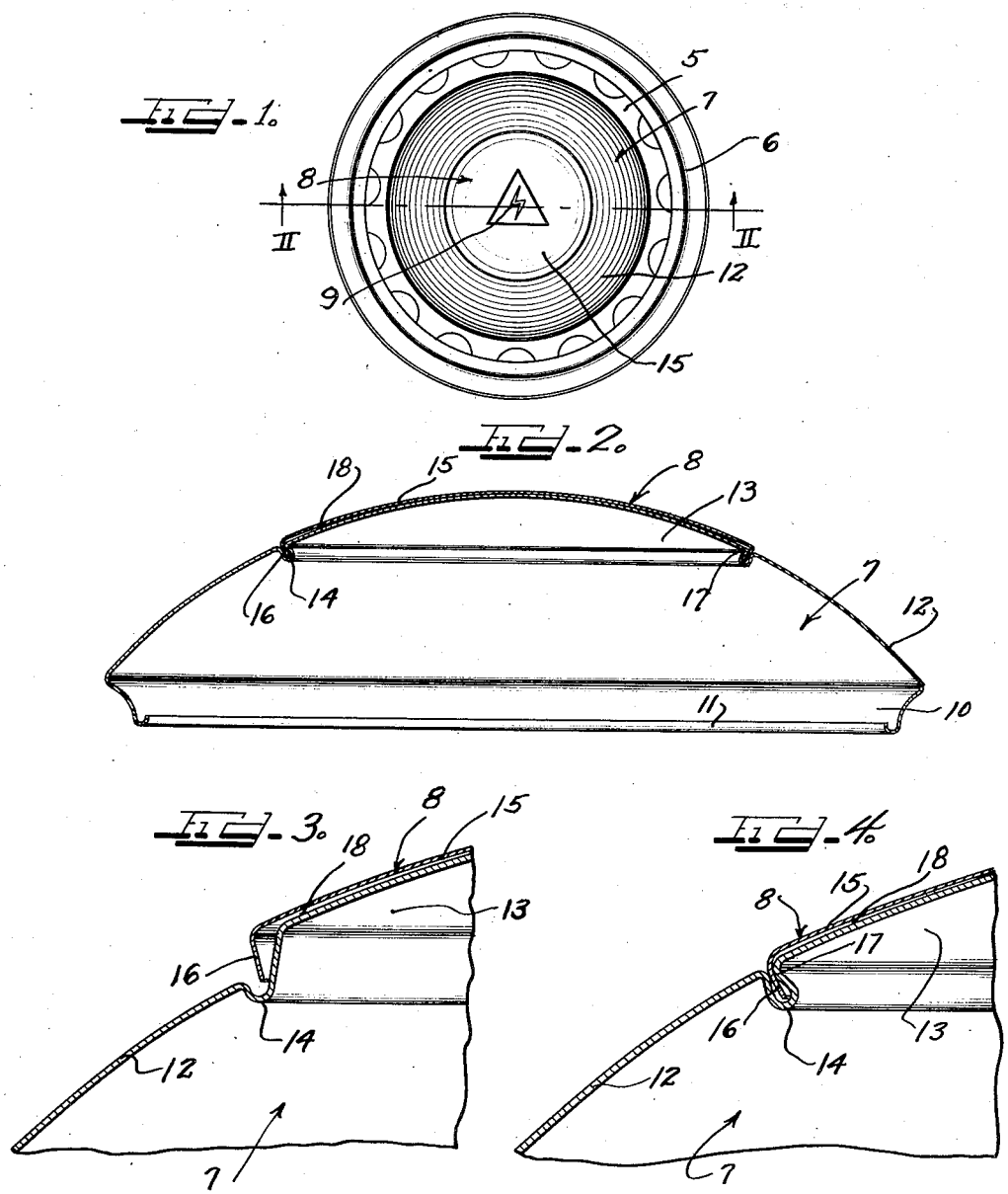
Inventor
GEORGE ALBERT LYON.

Patented Feb. 6, 1940

2,189,743

UNITED STATES PATENT OFFICE 2,189,743

WHEEL COVER DISK

George Albert Lyon, Allenhurst, N. J.

Application August 2, 1937, Serial No. 156,873

1 Claim. (Cl. 301—37)

This invention relates to improvements in a wheel cover disk for association with a vehicle wheel, such, for example, as an automobile wheel, the disk structure being designed for snap-on engagement with the retaining means usually carried by the wheel.

It is an object of this invention to provide a wheel cover disk structure for association with the outer side surface of a vehicle wheel, which structure is simple in construction, highly durable, and economical to manufacture.

Another object of the invention is the provision of a wheel disk structure made up in composite form from two initially separate parts joined together in a novel manner.

A further object of the invention is the provision of a wheel cover disk structure in which a portion of the disk proper that is most susceptible to injury is covered by a combination protective and decorative element substantially permanently joined to the disk proper by a novel connection.

It is also an important feature of this invention to provide a wheel disk structure especially adapted to render substantially invisible most injuries resulting from objects thrown against the disk structure, abrasions and the like.

It is also an object of the invention to provide a wheel disk structure especially adapted to eliminate or be unaffected by many injurious happenings, such as abrasions, objects hurled against the structure, etc.

A further and important object of the invention is to provide a composite wheel disk structure especially formed so that while many causes of injuries, such as abrasions, dents and the like, will contact with the visible surface of the disk structure, the injury will only result in an invisible part of the structure, whereby the entire structure as a whole is enabled to retain its pleasing appearance through a longer period of time than usual.

A further object of the invention is the provision of a composite wheel cover disk structure made of initially two separate parts, which parts are substantially permanently connected, and one of the parts is held in association with the other by a gripping action of said other part.

Other objects and features of this invention will more fully appear from the following detailed description taken in connection with the accompanying drawing, which illustrates a single embodiment of the invention, and in which:

Figure 1 is a side elevational view of a vehicle wheel, such as an automobile wheel, equipped with a wheel cover disk structure embodying principles of the invention;

Figure 2 is a bottom plan sectional view through the disk structure alone, separate from the wheel, taken substantially as indicated by the line II—II of Figure 1, looking in the direction of the arrows;

Figure 3 is an enlarged fragmentary sectional view, taken on the same location as Figure 2, but illustrating the two parts of the disk structure just prior to completion of the joining operation; and Figure 4 is a fragmentary enlargement of a portion of Figure 2.

As shown on the drawing:

The illustrated embodiment of the invention is shown associated with a vehicle wheel, in this instance, an automobile wheel 5, having the usual drop center tire rim 6. The invention is located over the outer side surface of the wheel and a crown part of the disk structure centers itself over the hub of the wheel, the circumferential portion of the disk structure surrounding the crown part extending over the side surface of the wheel and terminating preferably in any desirable location inside the outer circumferential edge of the rim 6.

The wheel disk cover structure includes a disk proper generally indicated by numeral 7, and a crown element generally indicated by numeral 8 which is a combination protective and decorative element. This element 8, in this instance, seats over a crown portion of the disk proper substantially opposite the hub of the wheel, and may be provided with any suitable proprietary emblem or other decoration, as indicated at 9 in Figure 1.

The disk proper 7 includes an obliquely inwardly extending annular flange 10 having a turned inner end 11 for engagement with the spring retaining elements or equivalent means usually carried by the vehicle wheel for holding the disk in operative association over the side surface of the wheel. The disk is applied to the wheel by pressing the same axially into engagement with the wheel, the retaining elements snapping over the turned margin 11 of the flange 10. The outer peripheral edge of the disk preferably extends beyond the flange 10, so that this flange as well as the engagement of the retaining elements are effectively concealed from view when the disk is in position on a wheel.

The disk proper also includes an outer circumferential portion 12 which overlies the aforesaid flange 10, and an inner crown portion 13 defined by a re-entrant groove formation 14, preferably formed integrally in the single piece of stock from which the disk proper is made. This stock may be of a comparatively economical steel. The crown element generally indicated by numeral 8 includes a dome-shaped central portion 15 and a depending circumferential skirt or flange 16. This crown element is preferably made from a comparatively high grade steel, such, for example, as stainless steel.

The crown element is joined to the disk proper in a novel manner and by a novel method similar to that described and claimed in my copending application for Letters Patent entitled "Method of forming a wheel cover", filed of even date herewith, Serial No. 156,871.

For the purpose of clarity, in Figure 3 I have illustrated the crown element and disk proper prior to the completion of the connecting operation. It will be seen that the re-entrant groove formation 14 is relatively widely open near the top thereof, and the skirt portion 16 of the crown element, even though extending somewhat obliquely inwardly, easily enters the groove. By a suitable method, more fully explained in my aforesaid copending application, the two parts are formed together into the configuration seen in Figure 4. It will be noted that the groove has been deepened, the flange extends substantially the full depth of the groove, and the upper walls of the groove are brought together, as indicated at 17 in Figure 4, while the flange or skirt 16 is tightly gripped between the walls of the groove at 17. The parts are thus substantially permanently joined together in a simple and economical manner.

It will be understood that the crown part 13 of the disk proper, since it overlies the hub of the wheel and extends axially outwardly beyond any other portion of the wheel, is the part most susceptible to injury from objects thrown thereagainst, abrasions and the like. The crown element 8 is made of a high grade stainless steel, and thus effectively protects the crown portion of the disk proper from any injuries likely to cause rusting and similar deterioration.

In the present instance, however, the crown element 8 performs another novel and highly advantageous function. It will be noted that this element is so shaped as to intimately contact with the crown part of the disk proper only in the immediate central region, both before and after the completion of the joining operation above described. There is, therefore, a clearance 18 extending annularly around the central portion between these two parts. The crown element 8 is in and of itself resilient in character, and the joining operation is such as to enhance this resiliency, so that over the clearance 18 the crown element is flexible. This flexibility is of such magnitude that when an object, such as a stone, is hurled against this portion of the entire structure with sufficient force to dent or similarly injure the structure, the force of the blow is somewhat absorbed by the flexibility of the crown element, and in the event a dent does result it results in the crown part of the disk proper and not in the crown element 8.

It will thus be seen that the structure is such as to eliminate many possible injuries, but when an injury does happen, the structure will, in many instances, transfer the injury to an invisible part of the structure, even though that which causes the injury contacts a visible part of the structure.

It is apparent, therefore, that I have provided a novel wheel cover disk structure of exceptional durability, in which structure a protective and decorative element is attached to a disk proper by a simple and economical connection and in such a manner as to afford novel protection and aid in maintaining the pleasing appearance of the structure as a whole through a great length of time. Of course, the outer circumferential portion 12 of the disk proper may be painted, enameled or otherwise provided with a desired color in keeping with the appointments of the vehicle, and if a contrast is desired, the crown element 8 may be left in a highly polished condition, thus presenting a pleasing contrasting arrangement of colors.

Now, I desire it understood that while I have illustrated and described in detail a preferred form of my invention, the invention is not to be thus limited, but only insofar as defined by the scope and spirit of the appended claim.

I claim as my invention:

In a wheel cover structure, a wheel cover member of substantially dome-shape having a crown part defined by a re-entrant groove, and a second member overlying said crown part and provided with a skirt extending into said groove, said second member being flexible and contacting said crown part only in the central region thereof and at its point of attachment in the re-entrant groove.

GEORGE ALBERT LYON.